(12) United States Patent
Takaoka et al.

(10) Patent No.: US 11,143,507 B2
(45) Date of Patent: Oct. 12, 2021

(54) INFORMATION PROCESSING APPARATUS AND INFORMATION PROCESSING METHOD

(71) Applicant: SONY CORPORATION, Tokyo (JP)

(72) Inventors: Tomohisa Takaoka, Kanagawa (JP);
Masatomo Kurata, Tokyo (JP);
Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 512 days.

(21) Appl. No.: 15/759,998

(22) PCT Filed: Aug. 19, 2016

(86) PCT No.: PCT/JP2016/074286
§ 371 (c)(1),
(2) Date: Mar. 14, 2018

(87) PCT Pub. No.: WO2017/056777
PCT Pub. Date: Apr. 6, 2017

(65) Prior Publication Data
US 2019/0049250 A1 Feb. 14, 2019

(30) Foreign Application Priority Data
Sep. 28, 2015 (JP) .............................. JP2015-189384

(51) Int. Cl.
*G01C 21/00* (2006.01)
*G01C 21/20* (2006.01)
(Continued)

(52) U.S. Cl.
CPC .......... *G01C 21/005* (2013.01); *G01C 21/08* (2013.01); *G01C 21/12* (2013.01); *G01C 21/20* (2013.01); *G01C 21/206* (2013.01); *G08G 1/005* (2013.01)

(58) Field of Classification Search
CPC .... G01C 21/005; G01C 21/206; G01C 21/20;
G01C 21/12; G01C 21/08; G08G 1/005
See application file for complete search history.

(56) References Cited

U.S. PATENT DOCUMENTS

2011/0246148 A1   10/2011  Gupta et al.
2012/0245881 A1*  9/2012  Takaoka ................ B61L 25/025
                                                  702/128
(Continued)

FOREIGN PATENT DOCUMENTS

CN      102939784 A    2/2013
CN      105246043 A    1/2016
(Continued)

OTHER PUBLICATIONS

International Search Report and Written Opinion of PCT Application No. PCT/JP2016/074286, dated Nov. 29, 2016, 09 pages.

*Primary Examiner* — Alexander Satanovsky
(74) *Attorney, Agent, or Firm* — Chip Law Group

(57) ABSTRACT

Provided is an information processing apparatus that includes an estimation unit that estimates, based on sensing data provided by a plurality of sensors carried or worn by a user, a type of a moving body on which the user is riding. The information processing apparatus further includes a selection unit that selects information to be used for processing for obtaining a position of the user in the moving body using the type of the moving body estimated by the estimation unit.

10 Claims, 10 Drawing Sheets

(51) Int. Cl.
*G01C 21/08* (2006.01)
*G01C 21/12* (2006.01)
*G08G 1/005* (2006.01)

(56) References Cited

U.S. PATENT DOCUMENTS

| | | | |
|---|---|---|---|
| 2013/0017842 A1 | 1/2013 | Gupta et al. | |
| 2013/0184012 A1 | 7/2013 | Gupta et al. | |
| 2014/0358603 A1* | 12/2014 | Viger | G06Q 10/08 |
| | | | 705/7.12 |
| 2015/0175179 A1* | 6/2015 | Green | B61L 21/06 |
| | | | 246/27 |
| 2015/0338544 A1* | 11/2015 | Fujiwara | G01P 13/00 |
| | | | 324/345 |

FOREIGN PATENT DOCUMENTS

| | | |
|---|---|---|
| EP | 2556706 A1 | 2/2013 |
| JP | 2012-194161 A | 10/2012 |
| JP | 2014-142345 A | 8/2014 |
| JP | 2015-069478 A | 4/2015 |
| KR | 10-2012-0140254 A | 12/2012 |
| KR | 10-2014-0142361 A | 12/2014 |
| WO | 2011/127005 A1 | 10/2011 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/074286 filed on Aug. 19, 2016, which claims priority benefit of Japanese Patent Application No. JP 2015-189384 filed in the Japan Patent Office on Sep. 28, 2015. Each of the above-referenced applications is hereby incorporated herein by reference in its entirety.

TECHNICAL FIELD

The present disclosure relates to an information processing apparatus, an information processing method, and a computer program.

BACKGROUND ART

Global navigation satellite systems (GNSSs), typified by the Global Positioning System (GPS), have been widely used in methods for detecting a user's position. However, in a GNSS, sufficient position detection accuracy is not always acquired indoors or in a built-up area where it is difficult to receive radio waves from satellites. In such cases, it is possible to employ a method of estimating a user's position, for example, on the basis of communicable access points of Wi-Fi or the like and the strengths of radio waves from the access points. However, it is difficult for this method to improve the accuracy since access points, the locations of which have been specified, are limited or the strength of radio waves is affected by various conditions. A technology for autonomous positioning used as a solution to these cases is described in Patent Literature 1.

CITATION LIST

Patent Literature

Patent Literature 1: JP 2013-210300A

DISCLOSURE OF INVENTION

Technical Problem

However, in a case of considering applying a positioning technology through use of sensors to a large moving body such as a ship (in particular, a large cruise ship) or a railway train, motions of the moving body itself are added as noise to sensor data that a sensor held by a user outputs.

Therefore, the present disclosure proposes an information processing apparatus, an information processing method, and a computer program being novel and improved in which, when a positioning technology through use of sensors is applied to a large moving body, accuracy in detecting a position in the moving body can be improved.

Solution to Problem

According to the present disclosure, there is provided an information processing apparatus including: an estimation unit configured to, on a basis of first sensing data provided by a plurality of sensors carried or worn by a user, estimate a type of a moving body on which the user is riding; and a selection unit configured to select information to be used for processing for obtaining a position of the user in the moving body using the type of the moving body estimated by the estimation unit.

In addition, according to the present disclosure, there is provided an information processing method including: on a basis of first sensing data provided by a sensor carried or worn by a user, estimating a type of a moving body on which the user is riding; and selecting information to be used for processing for obtaining a position of the user in the moving body using the estimated type of the moving body.

In addition, according to the present disclosure, there is provided a computer program causing a computer to execute: on a basis of first sensing data provided by a sensor carried or worn by a user, estimating a type of a moving body on which the user is riding; and selecting information to be used for processing for obtaining a position of the user in the moving body using the estimated type of the moving body.

Advantageous Effects of Invention

According to the present disclosure as described above, it is possible to provide an information processing apparatus, an information processing method, and a computer program being novel and improved in which, when a positioning technology through use of sensors is applied to a large moving body, accuracy in detecting a position in the moving body can be improved.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
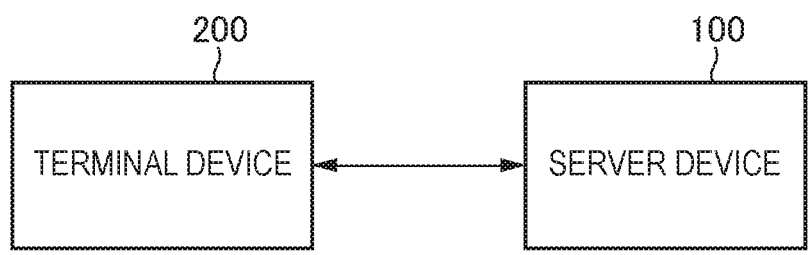
FIG. 1 is an explanatory diagram showing a configuration example of a positioning system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First Embodiment
1.1. System configuration example
1.2. Configuration example of terminal device
1.3. Configuration example of server device
1.3.1. When generating context map
1.3.2. In positioning
2. Second Embodiment
2.1. Configuration example 1 of server device
2.1.1. When generating context map
2.1.2. In positioning
2.2. Configuration example 2 of server device
2.2.1. When generating context map
2.2.2. In positioning
3. Hardware configuration example
4. Conclusion

1. First Embodiment

[1.1. System Configuration Example]

First, using FIG. 1, a configuration example of a positioning system according to a first embodiment of the present disclosure will be described. FIG. 1 is an explanatory diagram showing a configuration example of the positioning system according to the first embodiment of the present disclosure.

As shown in FIG. 1, the positioning system according to the first embodiment of the present disclosure includes a server device 100 and a terminal device 200.

The terminal device 200 is a device carried or worn by a user riding on a moving body such as a ship (in particular, a large cruise ship) or a railway train, which enables a free movement inside. The terminal device 200 may perform wireless communication with the server device 100. The terminal device 200 transmits sensor data acquired by sensors included in the inside to the server device 100. The terminal device 200 also receives a positioning result through use of the above-described sensor data, transmitted from the server device 100.

More specific examples of the configurations of the terminal device 200 will be described later, however, the sensors included in the terminal device 200 include an acceleration sensor, a gyro sensor, a geomagnetic sensor, an illuminance sensor, a temperature sensor, a barometric sensor, or the like and detects acceleration, an angular velocity, a geographic direction, an illuminance, a temperature, an atmospheric pressure, or the like applied to or associated with the terminal device 200. These various sensors can detect a variety of information as information regarding the user, for example, as information representing the user's movement, orientation, or the like in the case where the user carries or wears the terminal device 200 including the sensors, for example. Further, the sensors may also include sensors that detect biological information of the user such as a pulse, a sweat, a brain wave, a tactile sense, a smell sense, or a taste sense. The terminal device 200 may include a processing circuit that acquires information representing the user's emotion by analyzing data of an image or sound detected by a camera or a microphone described later and/or information detected by such sensors.

Further, the sensors may acquire, as data, an image or sound around the user or device by a camera, a microphone, the various sensors described above, or the like. In addition, the sensors may also include a position detection function that detects an indoor or outdoor position. Specifically, the position detection function may include a global navigation satellite system (GNSS) receiver, a communication device and/or the like. For example, the GNSS may include a global positioning system (GPS), a global navigation satellite system (GLONASS), a Beidou navigation satellite system (BDS), a Quasi-Zenith satellites system (QZSS), Galileo, or the like. Although the following description will be given with reference to the case where the GPS is used as an example, a different GNSS may also be used in a similar manner. The communication device performs position detection using a technology such as, for example, Wi-Fi, multi-input multi-output (MIMO), cellular communication (for example, position detection using a mobile base station or a femto cell), or local wireless communication (for example, Bluetooth low energy (BLE) or Bluetooth (registered trademark)).

In the case where the sensors described above detect the user's position or situation (including biological information), the device including the sensors is, for example, carried or worn by the user. Alternatively, in the case where the device including the sensors is installed in a living environment of the user, it may also be possible to detect the user's position or situation (including biological information). For example, it is possible to detect the user's pulse by analyzing an image including the user's face acquired by a camera fixedly installed in an indoor space or the like.

The server device 100 is a server device provided inside a moving body such as an automobile, a ship, or a railway train, or outside the moving body. The server device 100 is a device that measures a current position of the terminal device 200 located inside the moving body, and distributes the result of positioning to the terminal device 200.

A case in which finger printing positioning is performed using sensor data output from a plurality of sensors in a moving body such as a ship or a train will be considered. When using finger printing positioning in which geomagnetism, acceleration, gyro, barometry, or the like is used in the moving body, a component different from a movement or action of a user carrying the terminal device 200 in the moving body may be output from the terminal device 200 in accordance with a change in acceleration/deceleration or motion direction, an orientation change, an altitude change, or the like of the moving body itself. Since the component different from a movement or action of the user carrying the terminal device 200 in the moving body will be noise, it is not possible to grasp an accurate position or action in the moving body of the user carrying the terminal device 200 in the moving body unless the noise is removed.

For example, in a case where a person carries a gyro sensor in a moving body, when the gyro sensor detects a rotation, it is not possible to distinguish whether the moving body is turning a curve or whether the person is walking while curving. In addition, for example, in a case where a person carries an acceleration sensor in a moving body, when the acceleration sensor detects a change in acceleration, it is not possible to distinguish whether the moving body has accelerated/decelerated or whether the person has accelerated/decelerated. In addition, for example, in a case where a person carries a barometric sensor in a moving body, when the barometric sensor detects a barometric change, it is not possible to distinguish whether the altitude of the moving body has changed or whether the altitude of the person in the moving body has changed. In addition, for example, in a case where a person carries a geomagnetic sensor in a moving body, when the geomagnetic sensor detects a change in geomagnetic direction, it is not possible to distinguish whether the direction of the moving body has changed or whether the direction of the person present in the moving body has changed.

Thus, the server device 100 corrects sensor data transmitted from the terminal device 200 using sensor data measured in the moving body. Then, the server device 100 executes processing of estimating an action of the user carrying the terminal device 200 and measuring the position of the user carrying the terminal device 200, using the corrected sensor data.

By correcting sensor data transmitted from the terminal device 200 using sensor data measured in the moving body, the server device 100 can estimate more accurately an action or position of the user carrying the terminal device 200. In addition, by correcting sensor data transmitted from the terminal device 200 using sensor data measured in the moving body, the server device 100 can generate, even inside the moving body, a map (context map) in which an estimated result of an action of the user carrying the terminal device 200 and an estimated result of the current position have been associated.

The configuration example of the positioning system according to the first embodiment of the present disclosure has been described above using FIG. 1. Subsequently, a configuration example of the terminal device 200 will be described.

[1.2. Configuration Example of Terminal Device]

Figure 2:
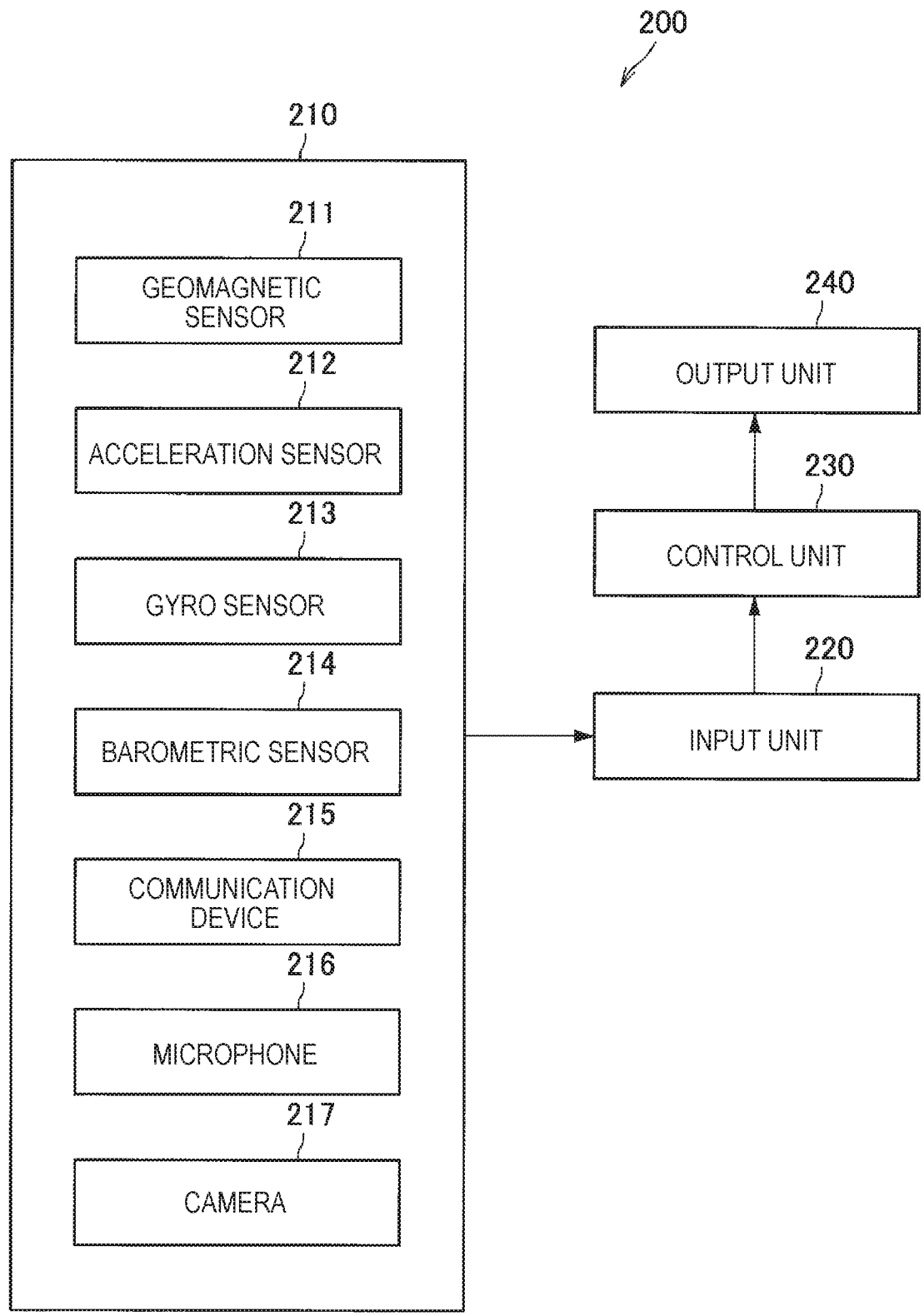
FIG. 2 is an explanatory diagram showing a configuration example of a terminal device 200 according to the first embodiment of the present disclosure.

FIG. 2 is an explanatory diagram showing a configuration example of the terminal device 200 according to the first embodiment of the present disclosure. A configuration example of the terminal device 200 according to the first embodiment of the present disclosure will be described below using FIG. 2.

As shown in FIG. 2, the terminal device 200 according to the first embodiment of the present disclosure includes a sensor unit 210, an input unit 220, a control unit 230, and an output unit 240.

The sensor unit 210 includes a device that senses a state of the terminal device 200. The sensor unit 210 outputs sensor data to the input unit 220. In the present embodiment, the sensor unit 210 includes a geomagnetic sensor 211, an acceleration sensor 212, a gyro sensor 213, a barometric sensor 214, a communication device 215, a microphone 216, and a camera 217, as shown in FIG. 2. The communication device 215 is essentially a communication device, but is utilized as a sensor that detects a reception state of a radio wave in the present embodiment. The microphone 216 and the camera 217 are also utilized as sensors that detect a surrounding sound and environment in the present embodiment.

The geomagnetic sensor 211 is a sensor that outputs the magnitude and direction of a magnetic field (magnetic field) as sensor data. The acceleration sensor 212 is a sensor that outputs information regarding acceleration as sensor data. The gyro sensor 213 is a sensor that outputs information regarding an angular velocity as sensor data. The barometric sensor 214 is a sensor that outputs barometric information as sensor data.

As a matter of course, sensors included in the sensor unit 210 are not limited to those shown in FIG. 2.

Sensor data that the sensor unit 210 has output and data transmitted from another device, for example, the server device 100, are input to the input unit 220. The input unit 220 transfers sensor data that the sensor unit 210 has output and data transmitted from another device, for example, the server device 100, to the control unit 230.

The control unit 230 executes various types of processing of controlling the operations of the terminal device 200. The control unit 230 includes a processor or a processing circuit such as a central processing unit (CPU), a digital signal processor (DSP), an application specific integrated circuit (ASIC), or a field-programmable gate array (FPGA). Further, the control unit 230 may include a memory or a storage device that temporarily or permanently stores data read or written during execution of a program and a process by the processor or the processing circuit. The control unit 230 executes processing of causing the output unit 240 to output a current location of the terminal device 200, for example, and executes processing of outputting sensor data that the sensor unit 210 has output to the server device 100 through the output unit 240.

The output unit 240 outputs information provided from the control unit 230 to a user (who may be the same as or different from the user of the terminal device 200), an external device, or other services. For example, the output unit 240 may include software or the like that provides information to an output device, a control device or an external service.

The output device outputs the information provided from the control unit 230 in a format that is perceived by a sense such as a visual sense, a hearing sense, a tactile sense, a smell sense, or a taste sense of the user (who may be the same as or different from the user of the terminal device 200). For example, the output device is a display that outputs information through an image. Note that the display is not limited to a reflective or self-luminous display such as an electro-luminescence (EL) display or a liquid crystal display (LCD) and includes a combination of a light source and a waveguide that guides light for image display to the user's eyes, similar to those used in wearable devices or the like. Further, the output device may include a speaker to output information through a sound. The output device may also include a projector, a vibrator, or the like.

The control device controls a device on the basis of information provided from the control unit 230. The device controlled may be included in a device that realizes the output unit 240 or may be an external device. More specifically, the control device includes, for example, a processor or a processing circuit that generates a control command. In the case where the control device controls an external device, the output unit 240 may further include a communication device that transmits a control command to the external device. For example, the control device controls a printer that outputs information provided from the control unit 230 as a printed material. The control device may include a driver that controls writing of information provided from the control unit 230 to a storage device or a removable recording medium. Alternatively, the control device may control devices other than the device that outputs or records information provided from the control unit 230. For example, the control device may control a lighting device to activate lights, control a television to turn the display off, control an audio device to adjust the volume, or control a robot to control its movement or the like.

The software that provides information to an external service provides, for example, information provided from the control unit 230 to the external service using an API of the external service. The software may provide information to a server of an external service, for example, or may provide information to application software of a service that is being executed on a client device. The provided information may not necessarily be reflected immediately in the external service. For example, the information may be provided as a candidate for posting or transmission by the user to the external service. More specifically, the software may provide, for example, text that is used as a candidate for a uniform resource locator (URL) or a search keyword that the user inputs on browser software that is being executed on a client device. Further, for example, the software may post text, an image, a moving image, audio or the like to an external service of social media or the like on the user's behalf.

The configuration example of the terminal device 200 according to the first embodiment of the present disclosure has been described above using FIG. 2. Subsequently, a configuration example of the server device 100 according to the first embodiment of the present disclosure will be described.

[1.3. Configuration Example of Server Device]
(1.3.1. When Generating Context Map)

Figure 3:
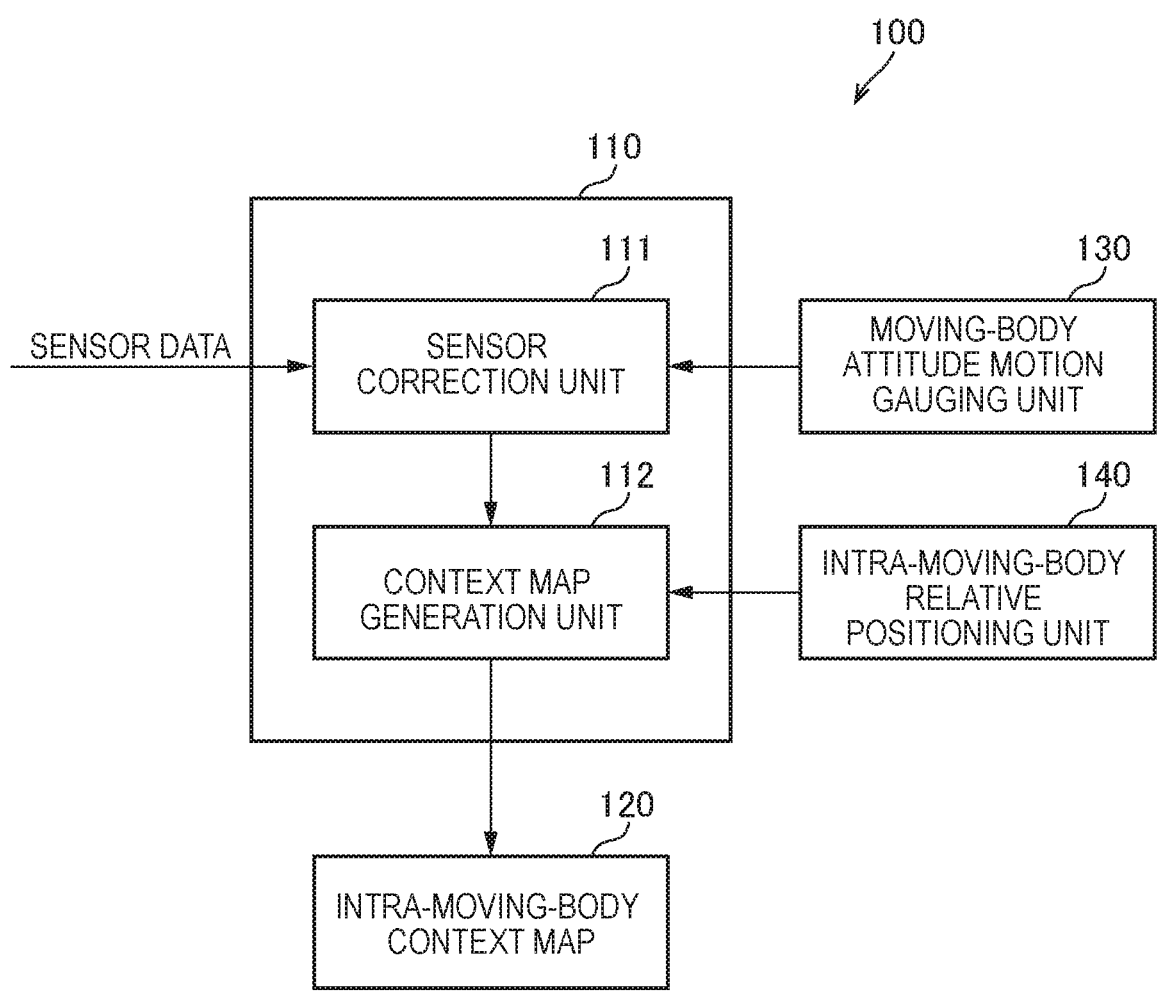
FIG. 3 is an explanatory diagram showing a configuration example of a server device 100 according to the first embodiment of the present disclosure.

FIG. 3 is an explanatory diagram showing a configuration example of the server device 100 according to the first embodiment of the present disclosure. What is shown in FIG. 3 is a configuration example of the server device 100 when generating a context map.

As shown in FIG. 3, the server device 100 includes a processing unit 110. Then, when generating a context map, the processing unit 110 includes a sensor correction unit 111 and a context map generation unit 112.

The sensor correction unit 111 corrects sensor data sent from the terminal device 200 using sensor data sent from a moving-body attitude motion gauging unit 130. The sensor data sent from the terminal device 200 may include acceleration data, angular velocity data, geomagnetic data, barometric data, and the like. The sensor correction unit 111 outputs sensor data after the correction to the context map generation unit 112. The moving-body attitude motion gauging unit 130 gauges the attitude and motion state of the moving body itself, and includes various sensors such as an acceleration sensor, an angular velocity sensor, a geomagnetic sensor, an illuminance sensor, a temperature sensor, and a barometric sensor, for example. Sensor data sent from the moving-body attitude motion gauging unit 130 indicates the attitude and motion amount of the moving body.

Assuming the sensor data sent from the terminal device 200 as X, the sensor data X may include a change amount Y of the attitude or motion of the terminal device 200 itself and sensor data Z sent from the moving-body attitude motion gauging unit 130. Therefore, as an example of correction of the sensor data sent from the terminal device 200, the sensor correction unit 111 obtains a difference between the sensor data X sent from the terminal device 200 and the sensor data Z sent from the moving-body attitude motion gauging unit 130 to obtain the change amount Y of the attitude or motion of the terminal device 200 itself.

When obtaining the change amount Y of the attitude or motion of the terminal device 200 itself, the sensor correction unit 111 obtains, for each piece of sensor data, a difference between the sensor data X sent from the terminal device 200 and the sensor data Z sent from the moving-body attitude motion gauging unit 130. For example, in order to obtain a change in angular velocity of the terminal device 200 itself, the sensor correction unit 111 obtains a difference between sensor data of the gyro sensor 213 sent from the terminal device 200 and sensor data of the gyro sensor sent from the moving-body attitude motion gauging unit 130.

The moving-body attitude motion gauging unit 130 includes a sensor that gauges an attitude change or a motion change of a moving body on which a user carrying or wearing the terminal device 200 is riding. If the server device 100 is provided for the moving body, the moving-body attitude motion gauging unit 130 may be provided inside the server device 100, or may be connected to the server device 100 by wire or wirelessly. If the server device 100 is not provided for the moving body, the moving-body attitude motion gauging unit 130 is provided for the moving body, and wirelessly transmits sensor data to the server device 100.

The context map generation unit 112 generates or updates an intra-moving-body context map 120 using sensor data corrected by the sensor correction unit 111. Note that "generate or update" may be simply described as "generate" collectively in the following description.

When generating the intra-moving-body context map 120, the context map generation unit 112 uses positioning data in an intra-moving-body relative positioning unit 140. The intra-moving-body relative positioning unit 140 includes a device that measures a relative position of the terminal device 200 in the moving body. The intra-moving-body relative positioning unit 140 emits a predetermined radio wave, for example, and measures the position of the terminal device 200 (a relative position as viewed from the intra-moving-body relative positioning unit 140) from a radio wave intensity when the terminal device 200 receives the radio wave.

By having a configuration as shown in FIG. 3, the server device 100 can correct sensor data sent from the terminal device 200 using sensor data sent from the moving-body attitude motion gauging unit 130. By correcting the sensor data sent from the terminal device 200 using the sensor data sent from the moving-body attitude motion gauging unit 130, the server device 100 can generate the intra-moving-body context map 120 that has a high degree of accuracy using the sensor data sent from the terminal device 200.

(1.3.2. In Positioning)

Figure 4:
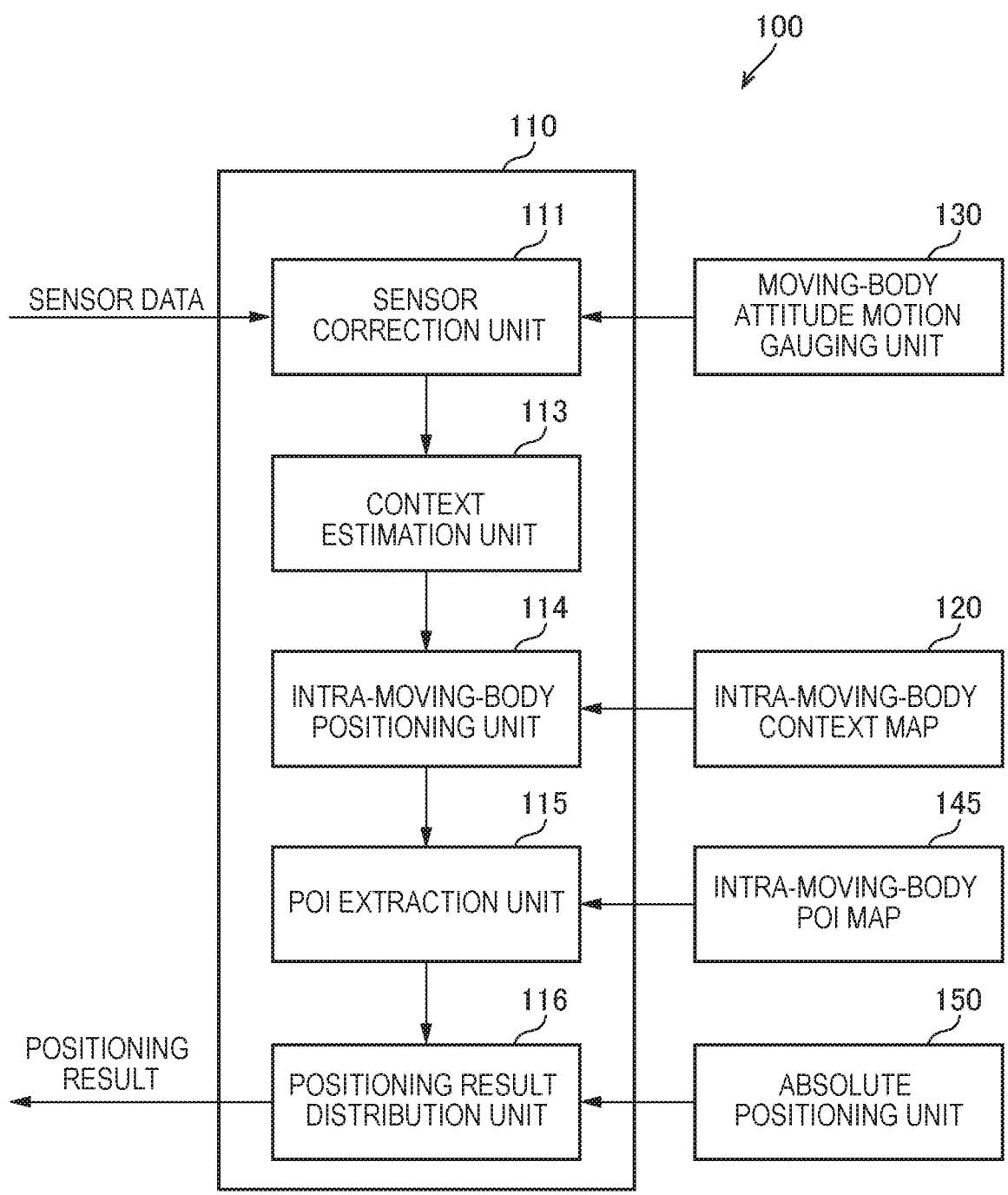
FIG. 4 is an explanatory diagram showing a configuration example of the server device 100 according to the first embodiment of the present disclosure.

FIG. 4 is an explanatory diagram showing a configuration example of the server device 100 according to the first embodiment of the present disclosure. What is shown in FIG. 4 is a configuration example of the server device 100 when measuring the position of the terminal device 200 in a moving body using a context map.

As shown in FIG. 4, the server device 100 includes the sensor correction unit 111, a context estimation unit 113, an intra-moving-body positioning unit 114, a POI extraction unit 115, and a positioning result distribution unit 116.

In a similar manner to the sensor correction unit 111 shown in FIG. 3, the sensor correction unit 111 corrects sensor data sent from the terminal device 200 using sensor data sent from the moving-body attitude motion gauging unit 130. The sensor data sent from the terminal device 200 and the moving-body attitude motion gauging unit 130 may include acceleration data, angular velocity data, geomagnetic data, barometric data, and the like. The sensor correction unit 111 outputs sensor data after the correction to the context estimation unit 113.

The context estimation unit 113 estimates a context of the user carrying or wearing the terminal device 200 using sensor data corrected in the sensor correction unit 111. Upon estimating the context of the user, the context estimation unit 113 outputs the result of estimation to the intra-moving-body positioning unit 114. The context estimation unit 113 can recognize an action label such as staying, walking, running, sitting, eating, sleeping, jumping, stairs, an elevator, an escalator, a bicycle, a bus, a train, an automobile, a ship, or an airplane, for example, by action recognition. Note that a technique for action recognition is described in many documents such as JP2012-8771A1, for example, and thus, detailed description will be omitted.

The intra-moving-body positioning unit 114 measures the position of the terminal device 200 in the moving body using the context of the user estimated by the context estimation unit 113 and the intra-moving-body context map 120. Upon measuring the position of the terminal device 200 in the moving body, the intra-moving-body positioning unit 114 outputs the result of positioning to the POI extraction unit 115.

The POI extraction unit 115 extracts a point of interest (POI) in the moving body from an intra-moving-body POI map 145 as facility information in the moving body using the result of positioning of the terminal device 200 in the intra-moving-body positioning unit 114. Upon extracting the POI from the intra-moving-body POI map 145 using the result of positioning of the terminal device 200 in the intra-moving-body positioning unit 114, the POI extraction unit 115 outputs the positioning result of the terminal device 200 in the moving body and the extracted POI to the positioning result distribution unit 116.

The positioning result distribution unit 116 distributes the positioning result of the terminal device 200 in the moving body and the extracted POI that have been output from the POI extraction unit 115 to the terminal device 200. By outputting the positioning result of the terminal device 200 in the moving body and the extracted POI that have been distributed from the positioning result distribution unit 116, the terminal device 200 can present the current position in the moving body to the user of the terminal device 200.

Figure 5:
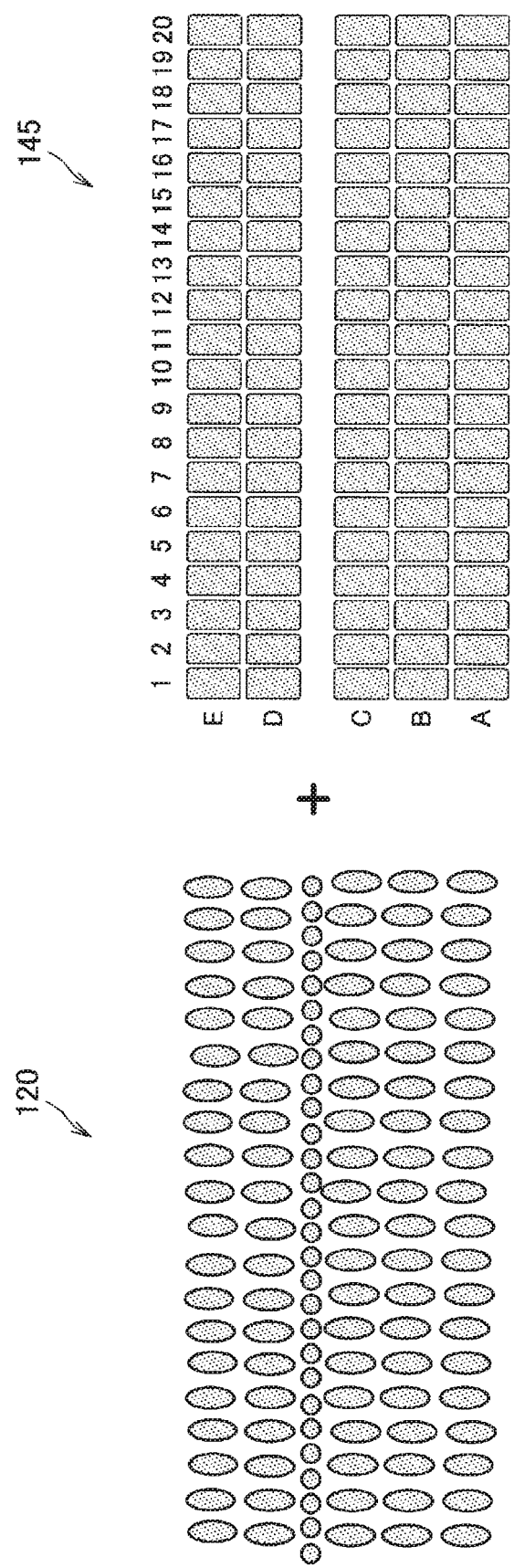
FIG. 5 is an explanatory diagram showing examples of an intra-moving-body context map 120 and an intra-moving-body POI map 145.

FIG. 5 is an explanatory diagram showing examples of the intra-moving-body context map 120 and the intra-moving-body POI map 145. By having a configuration as shown in FIG. 3, the server device 100 can generate the intra-moving-body context map 120 as shown in FIG. 5, for example. Each of ellipses in this intra-moving-body context map 120 shown in FIG. 5 indicates a place where the terminal device 200 is highly likely to be located. An action of the user carrying or wearing the terminal device 200 is associated with each of the ellipses. The associated action of the user is not limited to one, but information such as the probability of sitting, the probability of standing, and the probability of walking, for example, may be associated with each of the ellipses.

The server device 100 is capable of grasping an action of the user carrying or wearing the terminal device 200 at each place by referring to the intra-moving-body context map 120. However, merely by referring to the intra-moving-body context map 120, the server device 100 cannot grasp what place each place is.

Thus, by comparing to the intra-moving-body POI map 145 shown in FIG. 5, the server device 100 can grasp what place each place is. In the example shown in FIG. 5, the intra-moving-body POI map 145 represents a seat table of a Shinkansen train, and the POI extraction unit 115 can extract information indicating that the terminal device 200 is present at a seat 1E from the result of positioning of the terminal device 200 in the intra-moving-body positioning unit 114, for example.

2. Second Embodiment

[2.1. Configuration Example 1 of Server Device]

Subsequently, a second embodiment of the present disclosure will be described. In the first embodiment, the server device 100 that corrects sensor data transmitted from the terminal device 200 using sensor data measured in the moving body has been described. In the second embodiment, the server device 100 that estimates what moving state a user carrying or wearing the terminal device 200 is in from sensor data transmitted from the terminal device 200 will be described. By estimating what moving state the user is in, the server device 100 can select sensor data to be used for generation of a context map and positioning in a moving body from among pieces of sensor data transmitted from the terminal device 200 in accordance with the moving state.

(2.1.1. When Generating Context Map)

Figure 6:
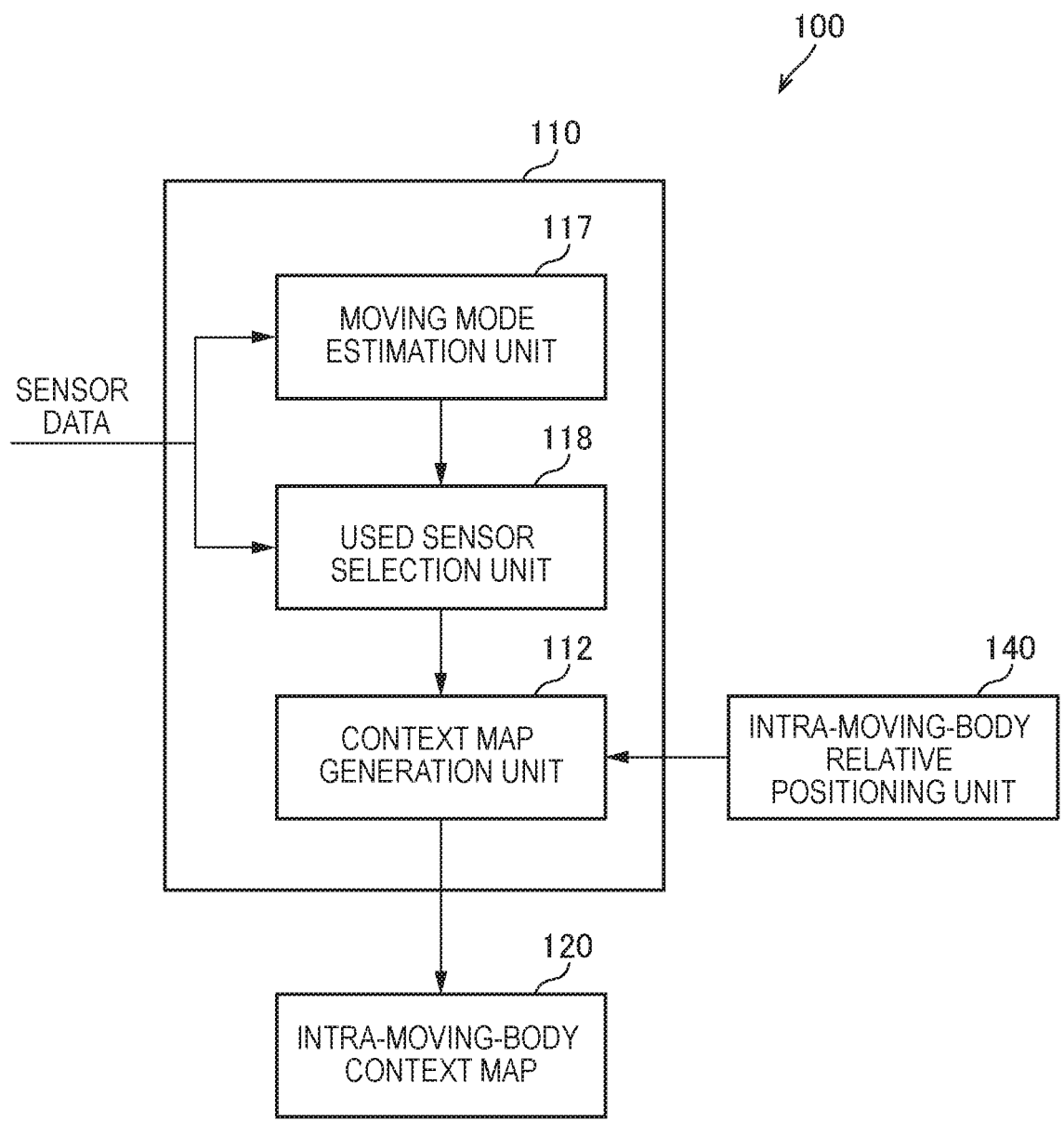
FIG. 6 is an explanatory diagram showing a configuration example of the server device 100 according to a second embodiment of the present disclosure.

First, a configuration example of the server device 100 when generating a context map will be described. FIG. 6 is an explanatory diagram showing a configuration example of the server device 100 according to the second embodiment of the present disclosure. What is shown in FIG. 6 is a configuration example of the server device 100 when generating a context map.

As shown in FIG. 6, the server device 100 according to the second embodiment of the present disclosure includes a moving mode estimation unit 117, a used sensor selection unit 118, and the context map generation unit 112.

The moving mode estimation unit 117 performs action recognition using sensor data transmitted from the terminal device 200 to estimate what moving state the user carrying or wearing the terminal device 200 is in. The sensor data sent from the terminal device 200 may include acceleration data, angular velocity data, geomagnetic data, barometric data, and the like. Hereinafter, the user's moving state will be called a moving mode as well. Upon estimating the user's moving mode, the moving mode estimation unit 117 outputs an estimated result to the used sensor selection unit 118.

The moving mode estimation unit 117 can recognize an action label such as staying, walking, running, sitting, eating, sleeping, jumping, stairs, an elevator, an escalator, a bicycle, a bus, a train, an automobile, a ship, or an airplane, for example, by action recognition through use of sensor data. Note that a technique for action recognition through use of sensor data is described in many documents such as JP2012-8771A1, for example, and thus, detailed description will be omitted.

On the basis of the estimated result of the moving mode of the user carrying or wearing the terminal device 200 obtained by the moving mode estimation unit 117, the used sensor selection unit 118 selects sensor data to be used for generation of the intra-moving-body context map 120 from among pieces of sensor data sent from the terminal device 200.

For example, in a case where a moving mode in which the terminal device 200 is present in an accelerating/decelerating train is estimated by the moving mode estimation unit 117, the used sensor selection unit 118 may determine not to use sensor data that the geomagnetic sensor 211 has output since the geomagnetism is disturbed by a motor in the accelerating/decelerating train.

In addition, for example, in a case where a moving mode in which the terminal device 200 is present in an automobile is estimated by the moving mode estimation unit 117, the used sensor selection unit 118 may determine not to use sensor data that the geomagnetic sensor 211 has output since the geomagnetism is disturbed in the automobile.

In addition, for example, in a case where a moving mode in which the terminal device 200 is present in a ship that navigates a raging sea is estimated by the moving mode estimation unit 117, the used sensor selection unit 118 may determine not to use sensor data that the acceleration sensor 212 has output.

Instead of deciding use or non-use of sensor data, the used sensor selection unit 118 may perform weighting when using sensor data. For example, in the case where the moving mode in which the terminal device 200 is present in a ship that navigates a raging sea is estimated by the moving mode estimation unit 117, the used sensor selection unit 118 may determine to reduce weight of sensor data that the acceleration sensor 212 has output.

The used sensor selection unit 118 may use whether the estimated moving mode produces a magnetic disturbance as a criterion for determining whether to perform weighting. For example, in a case where the estimated moving mode produces a magnetic disturbance, such as in a case where the terminal device 200 is present in a train, the used sensor selection unit 118 may decide use or non-use, instead of weighting sensor data that the geomagnetic sensor 211 has output. Note that, even in the same case of riding on a railcar, but in a case of being present in a vehicle, such as in a trolley, that is not influenced by a motor, the used sensor selection unit 118 may add weight to the sensor data that the geomagnetic sensor 211 has output.

The context map generation unit 112 generates or updates the intra-moving-body context map 120 using sensor data selected or weighted by the used sensor selection unit 118. Similarly to the first embodiment, the context map generation unit 112 uses positioning data in the intra-moving-body relative positioning unit 140 when generating or updating the intra-moving-body context map 120. The intra-moving-body relative positioning unit 140 includes a device that measures a relative position of the terminal device 200 in the moving body. The intra-moving-body relative positioning unit 140 emits a predetermined radio wave, for example, and measures the position of the terminal device 200 (a relative position as viewed from the intra-moving-body relative positioning unit 140) from a radio wave intensity when the terminal device 200 receives the radio wave.

Data at a certain place is steadily accumulated in the intra-moving-body context map 120. Therefore, since weight is added to sensor data, the weight may be used for a determination in positioning with reference to the intra-moving-body context map 120 which will be described later.

By having a configuration as shown in FIG. 6, the server device 100 can select sensor data sent from the terminal device 200 on the basis of the moving mode. By selecting sensor data sent from the terminal device 200 on the basis of the moving mode, the server device 100 can select sensor data that has a high degree of accuracy from among pieces of sensor data sent from the terminal device 200, and generate the intra-moving-body context map 120 that has a high degree of accuracy.

(2.1.2. In Positioning)

Figure 7:
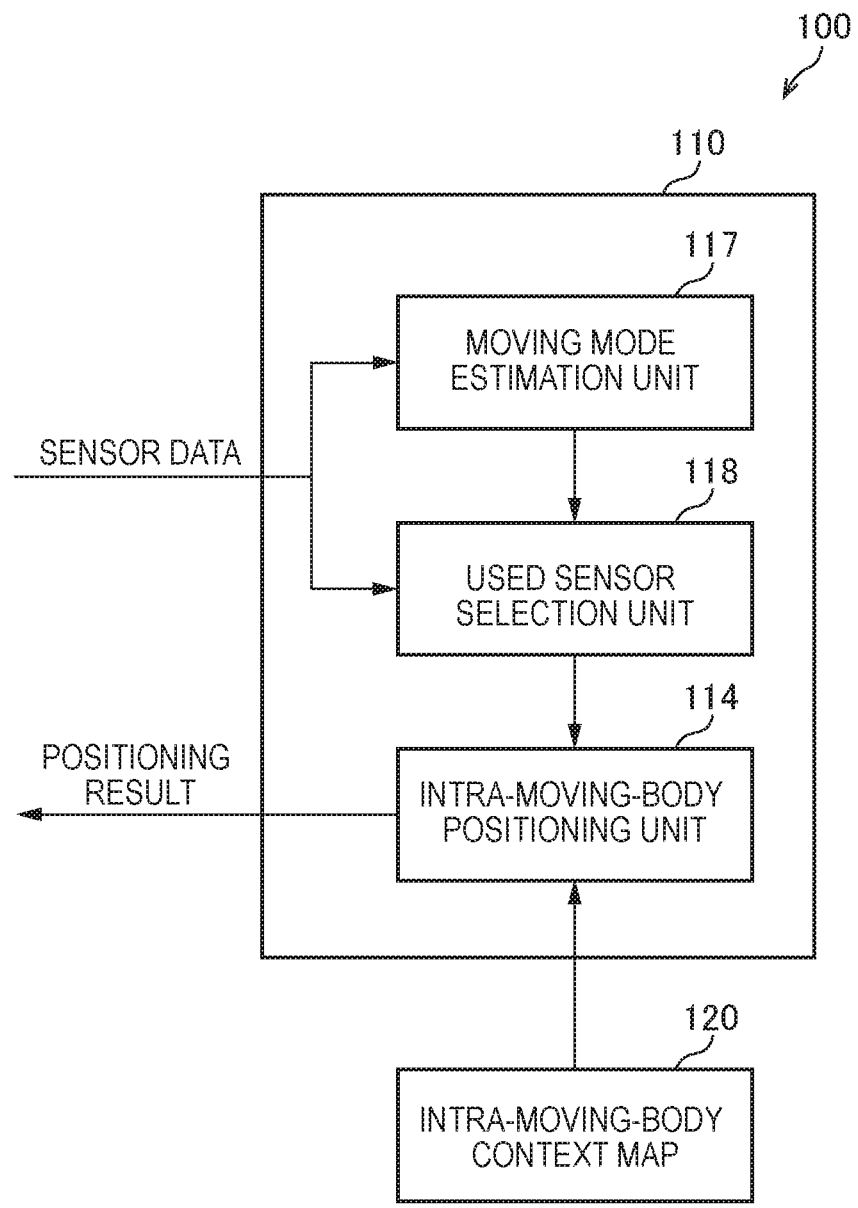
FIG. 7 is an explanatory diagram showing a configuration example of the server device 100 according to the second embodiment of the present disclosure.

FIG. 7 is an explanatory diagram showing a configuration example of the server device 100 according to the second embodiment of the present disclosure. What is shown in FIG. 7 is a configuration example of the server device 100 when measuring the position of the terminal device 200 in a moving body using a context map.

As shown in FIG. 7, the server device 100 according to the second embodiment of the present disclosure includes the moving mode estimation unit 117, the used sensor selection unit 118, and the intra-moving-body positioning unit 114.

Since the functions of the moving mode estimation unit 117 and the used sensor selection unit 118 are similar to those described using FIG. 6, detailed description will be omitted. The used sensor selection unit 118 outputs sensor data selected or weighted by the used sensor selection unit 118 to the intra-moving-body positioning unit 114.

The intra-moving-body positioning unit 114 measures the position of the terminal device 200 in the moving body using the sensor data selected or weighted by the used sensor selection unit 118 and the intra-moving-body context map 120. Upon measuring the position of the terminal device 200 in the moving body, the intra-moving-body positioning unit 114 outputs the result of positioning to the terminal device 200. The intra-moving-body positioning unit 114 may extract a POI in the moving body as facility information in the moving body. The intra-moving-body positioning unit 114 may extract a POI in the moving body using the result of positioning of the terminal device 200 in the intra-moving-body positioning unit 114 as described in the first embodiment.

By having a configuration as shown in FIG. 7, the server device 100 can select sensor data sent from the terminal device 200 on the basis of the moving mode. By selecting sensor data sent from the terminal device 200 on the basis of the moving mode, the server device 100 can measure the position of the terminal device 200 in the moving body on the basis of the intra-moving-body context map 120.

[2.2. Configuration Example 2 of Server Device]

The above-described configuration example 1 has shown the server device 100 that estimates the moving mode of the user carrying or wearing the terminal device 200 from sensor data, and selects or weights sensor data to be used on the basis of the estimated result of the moving mode. A subsequent configuration example 2 shows the server device 100 that not only selects or weights sensor data to be used on the basis of the estimated result of the moving mode, but also selects a context map.

Figure 8:
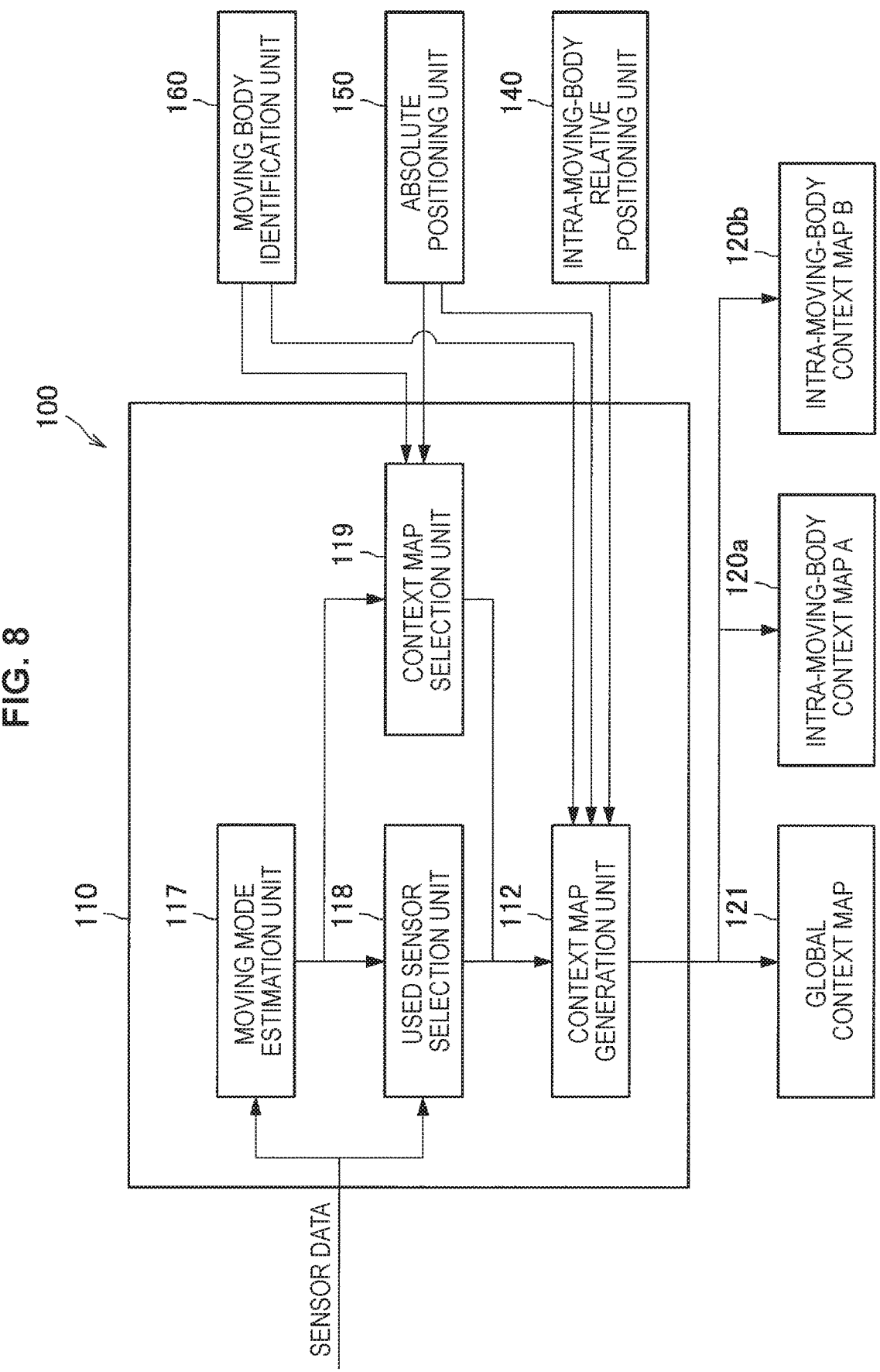
FIG. 8 is an explanatory diagram showing a configuration example of the server device 100 according to the second embodiment of the present disclosure.

FIG. 8 is an explanatory diagram showing a configuration example of the server device 100 according to the second embodiment of the present disclosure. What is shown in FIG. 8 is a configuration example of the server device 100 when generating a context map.

As shown in FIG. 8, the server device 100 according to the second embodiment of the present disclosure includes the moving mode estimation unit 117, the used sensor selection unit 118, a context map selection unit 119, and the context map generation unit 112.

Since the functions of the moving mode estimation unit 117 and the used sensor selection unit 118 are similar to those described using FIG. 6, detailed description will be omitted.

The context map selection unit 119 selects a context map to be generated on the basis of the estimated result of the moving mode of the user carrying or wearing the terminal device 200 obtained by the moving mode estimation unit 117. Upon selecting the context map to be generated, the context map selection unit 119 outputs the result of selection to the context map generation unit 112.

Intra-moving-body context maps 120*a*, 120*b* and a global context map 121 are shown in FIG. 8 as context maps to be selected. It is assumed that the intra-moving-body context map 120*a* is a context map selected in a case where the user carrying or wearing the terminal device 200 is present in a train, for example, and the intra-moving-body context map 120b is a context map selected in a case where the user carrying or wearing the terminal device 200 is present in a ship. In addition, the global context map 121 is a context map selected in a case where the user carrying or wearing the terminal device 200 is not present in a moving body.

The context map selection unit 119 may use positional information positioned by an absolute positioning unit 150 and information provided from a moving body identification unit 160. The absolute positioning unit 150 measures the absolute position of the moving body, and may include a GNSS receiver or the like. The moving body identification unit 160 provides information that identifies in which part (floor, vehicle, or the like) of the moving body the user is present, which may be provided by an acoustic wave, an electromagnetic wave, or the like, for example. By the moving body identification unit 160 providing information, the context map selection unit 119 can determine whether the user is present in a moving body (a train, a cruise ship, or the like) in the inside of which the user can move.

Upon determining that the user is present in a moving body from the information provided from the moving body identification unit 160, the context map selection unit 119 can select one of the intra-moving-body context maps 120a, 120b and non-use of the global context map 121. In addition, upon determining that the user is not present in a moving body from the estimated result of the user's moving mode, the context map selection unit 119 can select use of the global context map 121 and non-use of the intra-moving-body context maps 120a, 120.

In addition, for example, in a case where it can be identified that the user is present on a railway from positional information positioned by the absolute positioning unit 150 and it is determined that the user is present in a train from the estimated result of the user's moving mode, the context map selection unit 119 can select the intra-moving-body context map 120a.

In addition, for example, in a case where it can be identified that the user is present on the sea from positional information positioned by the absolute positioning unit 150 and it can be identified that the user is present inside a cruise ship from information provided from the moving body identification unit 160, the context map selection unit 119 can select the intra-moving-body context map 120b.

The context map generation unit 112 generates or updates the context map selected by the context map selection unit 119 using sensor data selected or weighted by the used sensor selection unit 118.

By having a configuration as shown in FIG. 8, the server device 100 can select sensor data sent from the terminal device 200 on the basis of the moving mode. In addition, by having a configuration as shown in FIG. 8, the server device 100 can select a context map to be generated on the basis of the moving mode, positioning information, and information that identifies a place inside the moving body.

By selecting sensor data sent from the terminal device 200 on the basis of the moving mode, the server device 100 can select sensor data that has a high degree of accuracy from among pieces of sensor data sent from the terminal device 200, and can generate a context map that has a high degree of accuracy. In addition, by selecting sensor data sent from the terminal device 200 on the basis of the moving mode, the server device 100 can select an appropriate context map in a case where a plurality of context maps have been prepared in accordance with the type of moving body.

(2.2.2. In Positioning)

Figure 9:
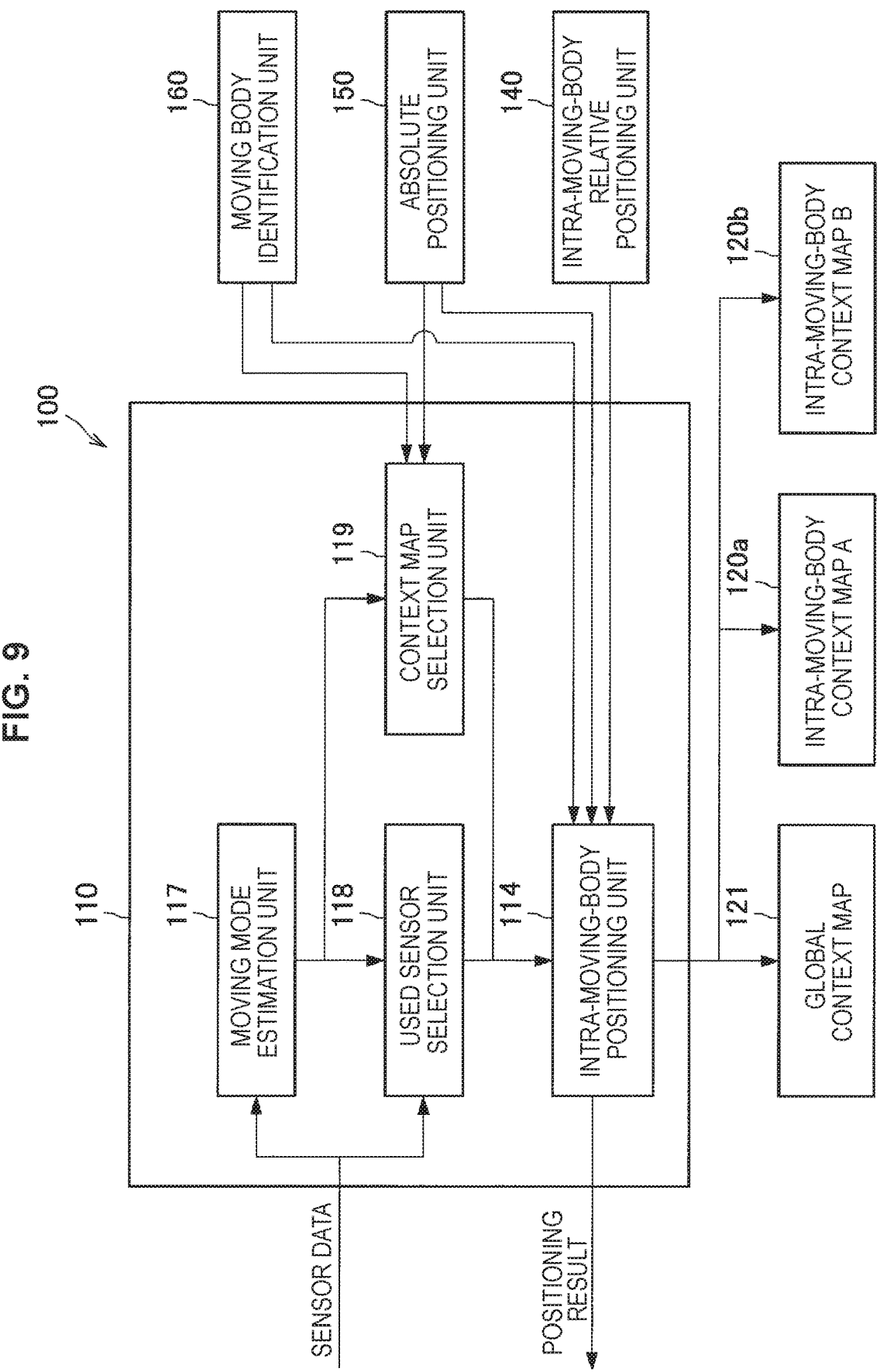
FIG. 9 is an explanatory diagram showing a configuration example of the server device 100 according to the second embodiment of the present disclosure.

FIG. 9 is an explanatory diagram showing a configuration example of the server device 100 according to the second embodiment of the present disclosure. What is shown in FIG. 9 is a configuration example of the server device 100 when measuring the position of the terminal device 200 in a moving body using a context map.

As shown in FIG. 9, the server device 100 according to the second embodiment of the present disclosure includes the moving mode estimation unit 117, the used sensor selection unit 118, and the intra-moving-body positioning unit 114.

Since the functions of the moving mode estimation unit 117, the used sensor selection unit 118, and the context map selection unit 119 are similar to those described using FIG. 8, detailed description will be omitted. The used sensor selection unit 118 outputs sensor data selected or weighted by the used sensor selection unit 118 to the intra-moving-body positioning unit 114. Upon selecting a context map to be used in positioning, the context map selection unit 119 outputs the result of selection to the intra-moving-body positioning unit 114.

The intra-moving-body positioning unit 114 measures the position of the terminal device 200 in the moving body using the sensor data selected or weighted by the used sensor selection unit 118 and the context map that the context map selection unit 119 has selected. Upon measuring the position of the terminal device 200 in the moving body, the intra-moving-body positioning unit 114 outputs the result of positioning to the terminal device 200.

By having a configuration as shown in FIG. 9, the server device 100 can select sensor data sent from the terminal device 200 on the basis of the moving mode. In addition, by having a configuration as shown in FIG. 9, the server device 100 can select a context map to be used in positioning on the basis of the moving mode, positioning information, and information that identifies a place inside the moving body.

By selecting sensor data sent from the terminal device 200 on the basis of the moving mode, the server device 100 can measure the position of the terminal device 200 in the moving body on the basis of the intra-moving-body context map 120. In addition, by selecting sensor data sent from the terminal device 200 on the basis of the moving mode, the server device 100 can select an appropriate context map in a case where a plurality of context maps have been prepared in accordance with the type of moving body.

For example, if it is found that the user carrying or wearing the terminal device 200 is moving on foot to a port from sensor data sent from the terminal device 200, the server device 100 can select the global context map 121. Thereafter, if it is found that the user carrying or wearing the terminal device 200 is present on the sea by measuring the absolute position, the server device 100 can select the intra-moving-body context map 120b.

As a matter of course, the server device 100 obtained by combining the first embodiment and the second embodiment described above can be realized. That is, it is also possible to realize the server device 100 that, upon correcting sensor data transmitted from the terminal device 200 using sensor data measured in the moving body, estimates what moving state the user carrying or wearing the terminal device 200 is in from the sensor data transmitted from the terminal device 200.

According to the first embodiment or the second embodiment described above, the server device 100 can measure the position of the terminal device 200 in the moving body, and provide the terminal device 200 with information regarding the position. For example, in a case where the user carrying the terminal device 200 is riding on a Shinkansen train, by measuring the position of the terminal device 200 in the Shinkansen train, the server device 100 can detect the vehicle number and the seat position in the Shinkansen train.

In addition, for example, in a case where the user carrying the terminal device 200 is riding on a cruise ship, by measuring the position of the terminal device 200 in the cruise ship, the server device 100 can detect a detailed position (such as a restaurant, a pool, or a casino, for example) in the cruise ship.

In addition, for example, the server device 100 may change information to be provided for the terminal device 200 in accordance with the position of the user carrying the terminal device 200. For example, in a case where the user carrying the terminal device 200 is riding on a trolley train for tourism, the server device 100 may change information to be provided for the terminal device 200, for example, information regarding a landscape visible from the train window, between a case where the user is sitting on the right side of the train and a case where the user is sitting on the left side.

Positional information in the moving body that the server device 100 has detected may be shared with another terminal device, and in that case, the server device 100 can provide the other terminal device with the positional information of the user carrying the terminal device 200 in the moving body.

3. Hardware Configuration Example

Figure 10:
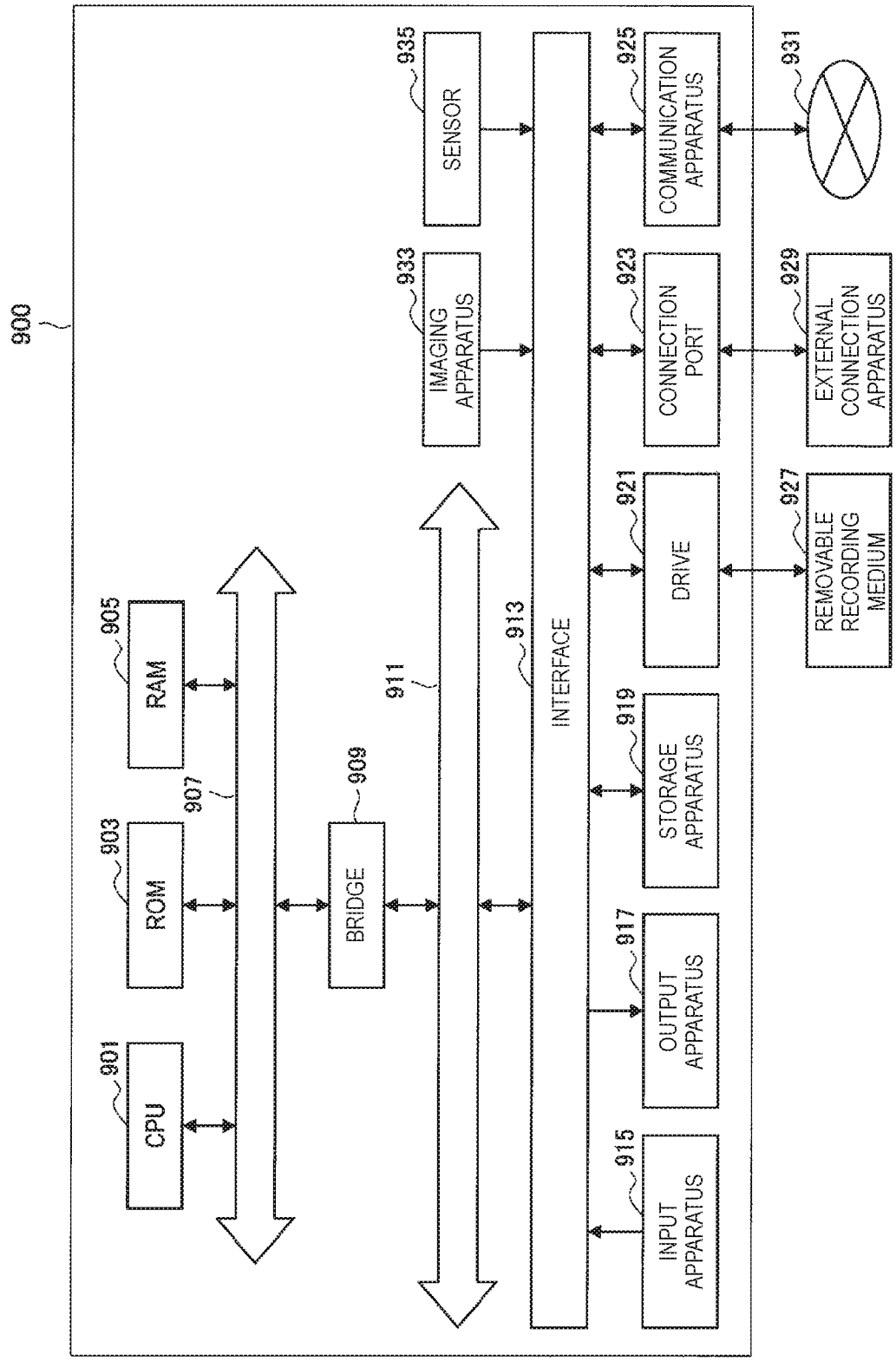
FIG. 10 is an explanatory diagram showing a hardware configuration example.

Next, with reference to FIG. 10, a hardware configuration of an information processing apparatus according to an embodiment of the present disclosure is explained. FIG. 10 is a block diagram illustrating a hardware configuration example of an information processing apparatus according to the embodiment of the present disclosure.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include an imaging apparatus 933, and a sensor 935, as necessary. The information processing apparatus 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing apparatus 900 according to various programs recorded in the ROM 903, the RAM 905, the storage apparatus 919, or a removable recording medium 927. The ROM 903 stores programs, operation parameters, and the like used by the CPU 901. The RAM 905 transiently stores programs used in execution by the CPU 901, and various parameters and the like that change as appropriate when executing such programs. The CPU 901, the ROM 903, and the RAM 905 are connected with each other via the host bus 907 configured from an internal bus such as a CPU bus. Further, the host bus 907 is connected to the external bus 911 such as a Peripheral Component Interconnect/Interface (PCI) bus via the bridge 909.

The input apparatus 915 is a device operated by a user such as a mouse, a keyboard, a touch panel, a button, a switch, and a lever, for example. The input apparatus 915 may be a remote control device that uses, for example, infrared radiation and another type of radio wave. Alternatively, the input apparatus 915 may be an external connection apparatus 929 such as a mobile phone that corresponds to an operation of the information processing apparatus 900. The input apparatus 915 includes an input control circuit that generates input signals on the basis of information which is input by a user to output the generated input signals to the CPU 901. A user inputs various types of data to the information processing apparatus 900 and instructs the information processing apparatus 900 to perform a processing operation by operating the input apparatus 915.

The output apparatus 917 includes an apparatus that can report acquired information to a user visually, audibly, haptically, or the like. The output apparatus 917 may be, for example, a display device such as a liquid crystal display (LCD) or an organic electro-luminescence (EL) display, an audio output apparatus such as a speaker or a headphone, a vibrator, or the like. The output apparatus 917 outputs a result obtained through a process performed by the information processing apparatus 900, in the form of video such as text and an image, sounds such as voice and audio sounds, vibration, or the like.

The storage apparatus 919 is an apparatus for data storage that is an example of a storage unit of the information processing apparatus 900. The storage apparatus 919 includes, for example, a magnetic storage unit device such as a hard disk drive (HDD), a semiconductor storage device, an optical storage device, a magneto-optical storage device, or the like. The storage apparatus 919 stores therein various data and the programs executed by the CPU 901, for example, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. Further, the drive 921 writes the record into the mounted removable recording medium 927.

The connection port 923 is a port used to connect devices to the information processing apparatus 900. The connection port 923 may be, for example, a Universal Serial Bus (USB) port, an IEEE1394 port, a Small Computer System Interface (SCSI) port, or the like. Further, the connection port 923 may be an RS-232C port, an optical audio terminal, a High-Definition Multimedia Interface (HDMI) (registered trademark) port, or the like. The connection of the external connection apparatus 929 to the connection port 923 makes it possible to exchange various data between the information processing apparatus 900 and the external connection apparatus 929.

The communication apparatus 925 is a communication interface including, for example, a communication device for connection to a communication network 931. The communication apparatus 925 may be, for example, a communication card or the like for a local area network (LAN), Bluetooth (registered trademark), Wi-Fi, or a wireless USB (WUSB). The communication apparatus 925 may also be a router for optical communication, a router for asymmetric digital subscriber line (ADSL), a modem for various types of communication, or the like. For example, the communication apparatus 925 transmits and receives signals or the like in the Internet or transmits and receives signals or the like to and from another communication device by using a predetermined protocol such as TCP/IP. Further, the communication network 931 connected to the communication apparatus 925 is a network established through wired or wireless connection. The communication network 931 may include, for example, the Internet, a home LAN, infrared communication, radio communication, satellite communication, or the like.

The imaging apparatus 933 is, for example, an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging apparatus 933 may capture a still image or a moving image.

The sensor 935 is, for example, various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing apparatus 900 such as an attitude of a housing of the information processing apparatus 900, and information regarding an environment surrounding the information processing apparatus 900 such as luminous intensity and noise around the information processing apparatus 900. Further, the sensor 935 may include a global positioning system (GPS) receiver that receives GPS signals to measure latitude, longitude, and altitude of the apparatus.

The example of the hardware configuration of the information processing apparatus 900 has been described. Each of the structural elements described above may include a general purpose component or may include hardware specialized for the function of each of the structural elements. The configuration may be changed as necessary in accordance with the state of the art at the time of working of the present disclosure.

3. Conclusion

According to the first embodiment of the present disclosure as described above, the server device 100 that can correct sensor data sent from the terminal device 200 using sensor data sent from the moving-body attitude motion gauging unit 130 is provided. By correcting sensor data sent from the terminal device 200 using sensor data sent from the moving-body attitude motion gauging unit 130, the server device 100 can generate the intra-moving-body context map 120 that has a high degree of accuracy using sensor data sent from the terminal device 200 and perform highly accurate positioning in a moving body by referring to the intra-moving-body context map 120.

In addition, according to the second embodiment of the present disclosure as described above, the server device 100 that can select sensor data sent from the terminal device 200 on the basis of the moving mode is provided. By selecting sensor data sent from the terminal device 200 on the basis of the moving mode, the server device 100 can select sensor data that has a high degree of accuracy from among pieces of sensor data sent from the terminal device 200 to generate the intra-moving-body context map 120 that has a high degree of accuracy and perform highly accurate positioning in a moving body by referring to the intra-moving-body context map 120.

Embodiments of the present disclosure can be applied to, in one example, the information processing apparatus as described above, a system, an information processing method executed in an information processing apparatus or a system, a computer program for causing an information processing apparatus to function, and a non-transitory tangible medium having the computer program recorded thereon.

Note that software that realizes a user interface or application shown in the above embodiments may be realized as a web application used via a network such as the Internet. The web application may be realized by a markup language such as a hypertext markup language (HTML), a standard generalized markup language (SGML), or an extensible markup language (XML), for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an estimation unit configured to, on a basis of first sensing data provided by a plurality of sensors carried or worn by a user, estimate a type of a moving body on which the user is riding; and a selection unit configured to select information to be used for processing for obtaining a position of the user in the moving body using the type of the moving body estimated by the estimation unit.

(2)

The information processing apparatus according to (1), in which the selection unit selects at least a part of the first sensing data.

(3)

The information processing apparatus according to (1) or (2), in which the selection unit selects map information generated on a basis of the first sensing data.

(4)

The information processing apparatus according to any one of (1) to (3), further including:

a processing unit configured to execute processing for obtaining the position of the user in the moving body using the first sensing data.

(5)

The information processing apparatus according to (4), in which the processing unit executes processing of positioning of the user who provides the first sensing data in the moving body, using map information generated using the first sensing data.

(6)

The information processing apparatus according to any one of (1) to (5), in which the selection unit selects information on a basis of absolute positional information.

(7)

The information processing apparatus according to any one of (1) to (6), in which
the selection unit selects information on a basis of information transmitted from the moving body.

(8)

The information processing apparatus according to (7), in which
the selection unit selects information on a basis of information that identifies a position inside the moving body, the information being transmitted from the moving body.

(9)

The information processing apparatus according to (4) or (5), in which
the processing unit extracts facility information on a basis of a result of the positioning processing.

(10)

The information processing apparatus according to any one of (1) to (9), in which
the first sensing data includes one of acceleration data, angular velocity data, and geomagnetic data.

(11)

The information processing apparatus according to any one of (1) to (10), in which
the moving body is one of a train, an automobile, and a ship.

(12)

An information processing method including:
on a basis of first sensing data provided by a sensor carried or worn by a user, estimating a type of a moving body on which the user is riding; and
selecting information to be used for processing for obtaining a position of the user in the moving body using the estimated type of the moving body.

(13)

A computer program causing a computer to execute:
on a basis of first sensing data provided by a sensor carried or worn by a user, estimating a type of a moving body on which the user is riding; and
selecting information to be used for processing for obtaining a position of the user in the moving body using the estimated type of the moving body.

REFERENCE SIGNS LIST 100 server device
200 terminal device

The invention claimed is:

1. An information processing apparatus, comprising:
a central processing unit (CPU) configured to:
receive first sensing data from a plurality of first sensors of a moving body, wherein the first sensing data indicates an attitude and motion amount of the moving body;
receive second sensing data from a plurality of second sensors, wherein the plurality of second sensors is wearable by a user riding the moving body;
correct the second sensing data based on the first sensing data;
estimate, based on the corrected second sensing data, a context of the user, wherein the context of the user indicates an action label of the user;
receive a relative position of the user with respect to the moving body;
generate map information based on the corrected second sensing data and the relative position of the user with respect to the moving body; and
obtain a position of the user in the moving body based on the context of the user and the map information.

2. The information processing apparatus according to claim 1, wherein the CPU is further configured to select the map information.

3. The information processing apparatus according to claim 1, wherein
the CPU is further configured to select the map information based on absolute positional information, and
the absolute positional information represents an absolute position of the moving body.

4. The information processing apparatus according to claim 1, wherein the CPU is further configured to:
receive specific information from the moving body; and
select the map information based on the specific information.

5. The information processing apparatus according to claim 4, wherein the specific information indicates that the position of the user is inside the moving body.

6. The information processing apparatus according to claim 1, wherein the CPU is further configured to extract, as facility information, a point of interest in the moving body based on the position of the user in the moving body.

7. The information processing apparatus according to claim 1, wherein the second sensing data includes one of acceleration data, angular velocity data, or geomagnetic data.

8. The information processing apparatus according to claim 1, wherein the moving body is one of a train, an automobile, or a ship.

9. An information processing method, comprising:
receiving first sensing data from a plurality of first sensors of a moving body, wherein the first sensing data indicates an attitude and motion amount of the moving body;
receiving second sensing data from a plurality of second sensors, wherein the plurality of second sensors is wearable by a user riding the moving body;
correcting the second sensing data based on the first sensing data;
estimating, based on the corrected second sensing data, a context of the user, wherein the context of the user indicates an action label of the user;
receiving a relative position of the user with respect to the moving body;
generating map information based on the corrected second sensing data and the relative position of the user with respect to the moving body; and
obtaining a position of the user in the moving body based on the context of the user and the map information.

10. A non-transitory computer-readable medium having stored thereon computer-executable instructions that, when executed by a central processing unit (CPU) of an information processing apparatus, cause the CPU to execute operations, the operations comprising:
receiving first sensing data from a plurality of first sensors of a moving body, wherein the first sensing data indicates an attitude and motion amount of the moving body;
receiving second sensing data from a plurality of second sensors, wherein the plurality of second sensors is wearable by a user riding the moving body;
correcting the second sensing data based on the first sensing data;
estimating, based on the corrected second sensing data, a context of the user, wherein the context of the user indicates an action label of the user;

receiving a relative position of the user with respect to the moving body;
generating map information based on the corrected second sensing data and the relative position of the user with respect to the moving body; and
obtaining a position of the user in the moving body based on the context of the user and the map information.

\* \* \* \* \*